(12) United States Patent
Ogawa et al.

(10) Patent No.: US 11,063,838 B2
(45) Date of Patent: Jul. 13, 2021

(54) SMART DISTRIBUTED SYSTEMS FOR MANAGING NETWORK DATA

(71) Applicant: FACET LABS, LLC, Los Gatos, CA (US)

(72) Inventors: Stuart Ogawa, Los Gatos, CA (US);
Lindsay Sparks, Seattle, WA (US);
Koichi Nishimura, San Jose, CA (US);
Wilfred P. So, Mississauga (CA)

(73) Assignee: FACET LABS, LLC, Los Gatos, CA (US)

( * ) Notice: Subject to any disclaimer, the term of this patent is extended or adjusted under 35 U.S.C. 154(b) by 0 days.

(21) Appl. No.: 16/636,072

(22) PCT Filed: Aug. 2, 2018

(86) PCT No.: PCT/US2018/044931
§ 371 (c)(1),
(2) Date: Feb. 3, 2020

(87) PCT Pub. No.: WO2019/028210
PCT Pub. Date: Feb. 7, 2019

(65) Prior Publication Data
US 2021/0168044 A1    Jun. 3, 2021

Related U.S. Application Data

(60) Provisional application No. 62/540,499, filed on Aug. 2, 2017.

(51) Int. Cl.
*H04L 29/08* (2006.01)
*H04L 12/24* (2006.01)
*G06N 3/04* (2006.01)

(52) U.S. Cl.
CPC ........... *H04L 41/16* (2013.01); *G06N 3/0454* (2013.01); *H04L 41/0645* (2013.01); *H04L 41/0816* (2013.01); *H04L 41/0896* (2013.01); *H04L 41/12* (2013.01)

(58) Field of Classification Search
CPC ...................................... H04L 41/16
See application file for complete search history.

(56) References Cited

U.S. PATENT DOCUMENTS 9,325,786 B2 * 4/2016 Chan ................... H04L 67/1091
2003/0189930 A1 * 10/2003 Terrell ................... H04L 49/90
370/389

* cited by examiner

*Primary Examiner* — Adnan M Mirza

(57) ABSTRACT

A system and related methods for making distributed, autonomous decisions on the management of network traffic and data are provided. The disclosed system and methods increasingly become smarter and faster over time based on the accumulated data across the network, and any data science or decision science associated with the system can be updated or modified via remote, autonomous updates. The system can comprise computing devices and systems across multiple layers of the network, wherein each layer of the network can comprise a plurality of nodes. Each node of the network can be enhanced or embedded with the Smart Distributed system, and the Smart Distributed system can provide each node of the network the ability to apply data or decision science to any data in real or near real-time.

36 Claims, 10 Drawing Sheets

SMART DISTRIBUTED SYSTEMS FOR MANAGING NETWORK DATA

CROSS-REFERENCE TO RELATED APPLICATIONS

This present patent application claims priority to U.S. Provisional Application No. 62/540,499 filed on Aug. 2, 2017 and titled "Smart Distributed Systems For Managing Network Data", the entire contents of which are herein incorporated by reference.

BACKGROUND

The global proliferation and adoption of electronic devices has led to creation of more data than can be stored. Furthermore, data computation growth now surpasses Moore's Law for global computation and the amount of data transmitted and stored across networks exceeds projected network bandwidth and data storage availability. In one recent analysis, 700 million users plus 20 billion Internet-of-Things (IoT) devices equated to approximately $4.5 \times 10^{23}$ interconnections among users and devices, a number which does not even include the actual data and the enriched metadata corresponding to the user-created data, machine data, and IoT data. Thus, $4.5 \times 10^{23}$, while a vast number, is only a portion of the data. We can refer to this type of data which continues to exponentially grow and change as "Extreme" or "Explosive" Data (XD).

Current computing environments send all XD to one or a few nodes or devices in order to analyze XD, apply data science and make decisions or take actions based on the XD. This approach is similar to conventional mainframe "hub and spoke", batch data or other similar traditional decision science processing framework or model. These conventional methods and techniques involve transmitting data from one node (i.e., the point of data creation) to other nodes across the network, prior to processing XD (e.g., capturing, indexing, storing, and graphing, to name a few steps) at those other nodes: such processes can involve significant time delay. Furthermore, the aforementioned conventional approach requires transmitting or receiving XD through various networks, which may exponentially increase network traffic and require larger bandwidths. In addition, once data/decision science is completed, the completed results need to travel back through the network and ultimately back to the user(s) or other end nodes (e.g., peripheral devices, systems, and the like).

Conventional methods, consequently, reinforce the extended user latency to perform data or decision science against inbound data and network traffic, and ultimately lengthen the time to receive, for example, real-time or near real-time recommendations and actions. Analyzing and making correct network decisions may involve significant amount of time and network bandwidth. Furthermore, conventional systems and methods may not enable an automated or proactive way to handle random surges of network traffic or respond to certain events that require additional network resources.

SUMMARY

In light of these problems, a different computing approach is suggested to manage the transmission of data across the network and provide automated allocation of network bandwidth and resources. The Smart Distributed Systems and related methods can externalize and distribute network decision making and perform autonomous network actions. Autonomous network actions may include hardware and software provisioning, administration, feature and functionality enablement/disablement, monitoring, configuration, autonomous bandwidth allocation, network traffic distribution, and the like. The Smart Distributed Systems, for example, may support automatic and autonomous network response based at least on network data science applied to local and global network traffic conditions, data content, and other information such as the destination address of the data and the like. The Smart Distributed Systems can be implemented at various nodes/layers of the network. Overall, the Smart Distributed System can greatly improve distribution of network traffic and network resources in an autonomous way, and improve means for effectively managing limited network resources when XD is involved.

Smart Distributed Systems may comprise XD processing resource and systems. XD processing resources and systems can be configured such that data collected or created by the Smart Distributed System (or by any nodes/devices that have Smart Distributed Systems embedded) may be processed locally, onboard the device/system or across a collection of Smart Distributed Systems. In particular, such an approach, as disclosed herein, can be used to provide a technical solution that can efficiently make distributed, decision science based recommendations and actions related to network data and/or traffic (e.g., prior to network overload or congestion), and provide increasingly smarter recommendations and actions over time. For example, currently available methods of creating and uploading XD to the public cloud for analysis may require extensive amount of time and networking bandwidth. Current network configurations lack the ability to intelligently distribute the network traffic to allocate bandwidth when faced with XD. Since network bandwidth is limited, many business entities or individuals may opt to delete a large portion of the XD due to high operational costs and inefficiencies. This can adversely impact the ability to train systems (e.g., for machine learning purposes) and/or devices for deep learning/machine learning applications, since XD can be too expensive to store and/or transmit.

In the contrary, the systems and related methods disclosed herein can be used to facilitate intelligent decision making at, or by, the Smart Distributed System, which can enable the efficient and timely application of machine learning, deep learning, and other related artificial intelligence techniques to network traffic and data relevant to the analysis of network traffic (e.g., data content, destination addresses). Consequently, the Smart Distributed System can enable optimization and enable efficient distribution of network traffic involving XD.

The Smart Distributed System may also help efficiently distribute computing resources and network bandwidth before bandwidth spikes occur, or autonomously load balance computing resources and network bandwidth during sustained bandwidth events. The approach disclosed herein may involve performing data analysis and applying decision science, throughout the various nodes of a network or networks, for data/information that is necessary, valuable, or important for the specific application, device, system, etc. For example, Smart Distributed Systems may be configured to analyze network traffic to detect/determine "known known" data, and such data may be discarded before being transmitted across the network for additional analysis, saving network bandwidth resources.

In another example, the Smart Distributed Systems can inspect and perform data science on network traffic as data passes through various networks, network nodes, and related network hardware/software. If the requested data (e.g., data requested by another system across the network), for example, is exactly the same as data that is already stored in a closer location within the network, then data science can automatically predict and transmit information over the network to redirect the requesting system(s), user(s), enterprise(s), entity(s), etc. to data stored locally.

Another benefit of embedding or installing Smart Distributed Systems across the network is that the Smart Distributed System may help eliminate any network XD "noise" (i.e., duplicate or unnecessary data), and progressively amplify and refine XD related network signals throughout the computing environment 100. Such system may enable users and data scientists to obtain trends, predictions, and recommendations much faster, and consequently, the system may be applied to facilitate autonomous network traffic management and control.

In an aspect, disclosed herein is a system for providing distributed and autonomous network actions. The system may comprise: a network comprising three layers, each layer comprising a plurality of nodes, wherein each of the plurality of nodes is connected to at least one other of the plurality of nodes; a first layer node comprising an end point device embedded with data science capabilities, wherein the end point device is configured to receive first layer data, wherein such first layer data comprises data received from one or more end point devices, and configured to apply data science to autonomously adjust the operations of the one or more end point devices based on the first layer data; a second layer node connected to the one or more first layer nodes, the second layer node comprising a network device embedded with data science capabilities, wherein the network device is configured to receive second layer data, and wherein the second layer data comprises data received from the one or more end point devices and/or the one or more network devices, and configured to apply data science to autonomously adjust the operations of the one or more end point devices and/or the one or more network devices based on the second layer data; and a third layer node connected to the one or more first layer nodes and/or the one or more second layer nodes, the third layer node comprising a compute node embedded with data science capabilities, wherein the compute node is configured to receive third layer data and to apply data science based on the third layer data, wherein the third layer data comprises data received from the one or more end point devices, the one or more network devices, and/or the one or more compute nodes, and configured to apply data science to autonomously adjust the operations of the one or more first, second, or third layer nodes, based on the third layer data.

In some embodiments, applying data science to the end point device comprises determining if: (i) the first layer data is nominal or constant; or (ii) the first layer data matches a pre-defined/specific pattern; or (iii) the first layer data exceeds a configurable operating threshold value or condition or (iv) the variation or change in the first layer data exceeds a configurable threshold.

In some embodiments, the end point device is configured to discard the first layer data if the first layer data is nominal or constant. The end point device may be configured to tag the first layer data if the first layer data matches a pre-defined pattern or a specific pattern. The end point device may be configured to flag the first layer data as urgent if the first layer data exceeds a certain operating threshold value or condition.

In some embodiments, the end point device is further configured to alert the one or more first layer elements, the one or more second layer elements, or the one or more third layer elements.

In some embodiments, the end point device is configured to autonomously increase network or computing resources if the variation or change in the first layer data exceeds a threshold.

In some embodiments, applying data science to the network device comprises determining if: (i) the second layer data is nominal; or (ii) the second layer data matches a specific pattern; (iii) the second layer data is exceeding a certain operating condition; or (iv) the variation or change in the second layer data exceeds a (configurable) threshold.

In some embodiments, the network device is configured to discard the second layer data if the second layer data is nominal or constant. The network device may be configured to tag the second layer data if the second layer data matches a specific pattern. The network device may be configured to flag the second layer data as urgent if the second layer data exceeds a certain operating threshold value or condition.

In some embodiments, the network device is further configured to alert the one or more first layer elements, the one or more second layer elements, or the one or more third layer elements.

In some embodiments, the network device is configured to autonomously increase network or computing resources if the variation or change in the second layer data exceeds a threshold.

In some embodiments, applying data science to the compute node comprises determining if: (i) the third layer data is nominal; (ii) the third layer data matches a specific pattern; (iii) the third layer data is exceeding a certain operating condition; or (iv) the variation or change in the third layer data exceeds a configurable threshold.

In some embodiments, the compute node is configured to discard the third layer data if the third layer data is nominal or constant. The compute node may be configured to tag the third layer data if the third layer data matches a pre-defined or specific pattern. The compute node is configured to flag the third layer data as urgent if the third layer data exceeds a certain operating threshold value or condition.

In some embodiments, the compute node is further configured to alert the one or more first layer elements, the one or more second layer elements, or the one or more third layer elements.

In some embodiments, the compute node is configured to autonomously increase network or computing resources if the variation or change in the third layer data exceeds a threshold.

In some embodiments, the end point device is configured to obtain or generate data.

In some embodiments, the network device comprises a router, a switch, or a load balancer.

In some embodiments, the data science capabilities are embedded in the network circuit board components of the network device, wherein the network circuit board components comprise FPGAs, ASICs, CPUs, and EEPROMs.

In some embodiments, the network device is configured to run distributed micro data science programs and applications In some embodiments, the first layer comprises a plurality of sub-layers.

In some embodiments, the second layer comprises a plurality of sub-layers.

In some embodiments, the third layer comprises a plurality of sub-layers.

In some embodiment, a first blockchain is distributed across multiple first layer nodes in the first layer, a second blockchain is distributed across multiple second layer nodes in the second layer, and a third blockchain is distributed across multiple third layer nodes in the third layer.

In some embodiments, a given first layer node on the first blockchain and a given third layer node on the third blockchain execute a transaction using the multiple second layer nodes in the second blockchain.

In some embodiments, in executing a transaction between a given first layer node on the first blockchain and a given third layer node on the third blockchain, the multiple second layer nodes in the second blockchain equate data specific to the given first layer device on the first blockchain to data specific to the given third layer device on the third layer blockchain; or the multiple second layer nodes in the second blockchain equate data specific to the given third layer device on the third blockchain to data specific to the given first layer device on the first layer blockchain; or both.

In some embodiments, a database is distributed across multiple first layer nodes in the first layer, a load balancer system comprises multiple second layer nodes in the second layer, and a master database is distributed across multiple third layer nodes in the third layer.

In some embodiments, the multiple first layer nodes comprise multiple end point devices, the multiple second layer nodes comprise multiple network devices, and the multiple third layer nodes comprise multiple compute nodes.

In some embodiments, a given first layer node queries the master database on the third layer, via the load balancer system.

In some embodiments, one of the first layer, the second layer and the third layer is used to implement a first portion of a neural network, and a remaining one of the first layer, the second layer and the third layer is used to implement a second portion of the neural network.

In some embodiments, a generator neural network is implemented in the first layer to output generated data, a discriminator neural network is implemented in the second layer to output classified or predicted data, and the classified or predicted data is post-processed in the third layer; and wherein the generator neural network and the discriminator neural network form a generative adversarial network.

In some embodiments, the second layer obtains real data, and the discriminator neural network on the second layer outputs a classification whether the real data is an anomaly or a known known.

In some embodiments, the second layer obtains real data, the discriminator neural network on the second layer outputs a prediction whether future data or a future event is an anomaly or a known known.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1:
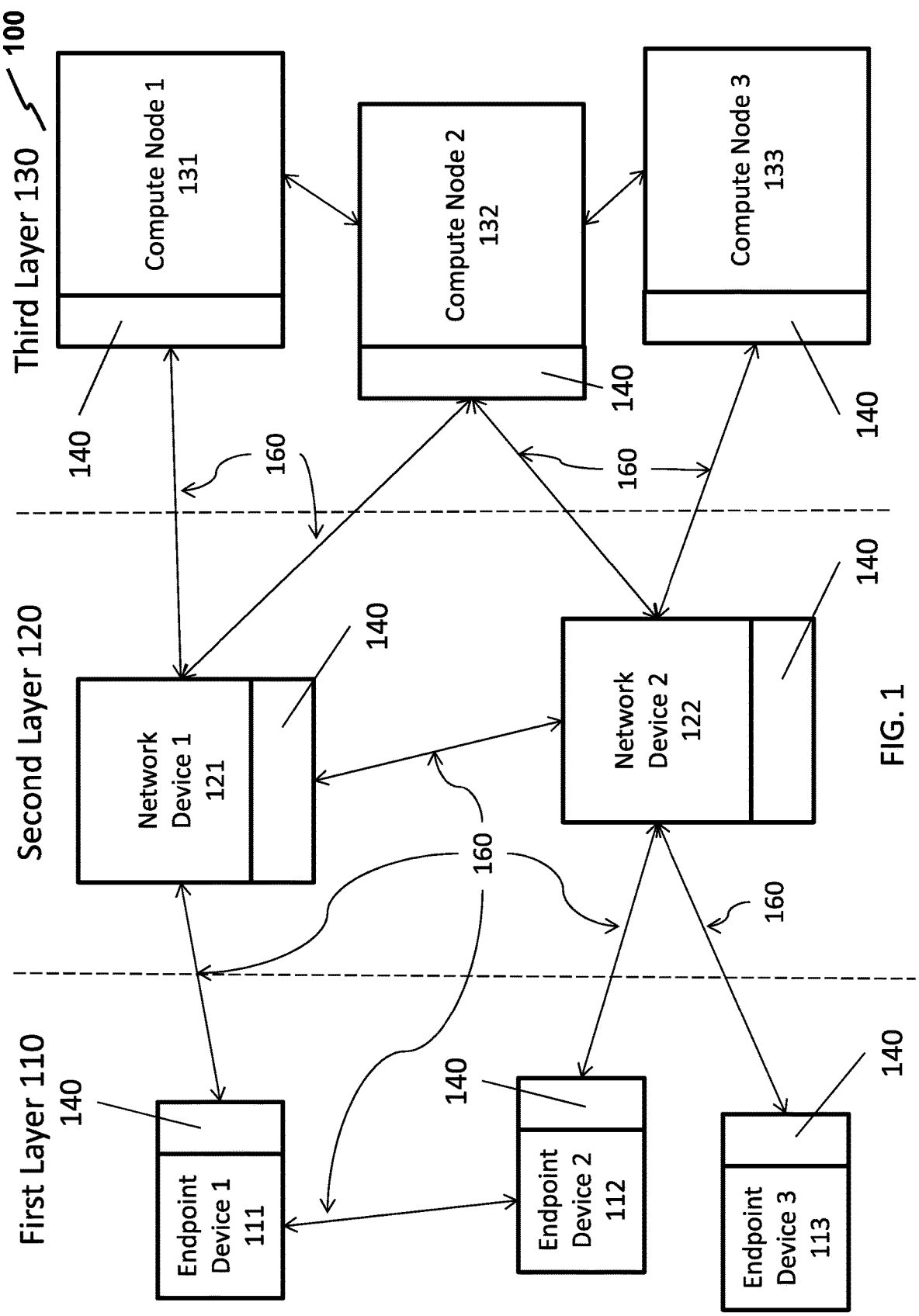
FIG. 1 shows an environment in which Smart Distributed Systems may operate according to an embodiment described herein.

Specific embodiments of the disclosed method and system will now be described with reference to the drawings. Nothing in this detailed description is intended to imply that any particular step, component, or feature is essential to the invention.

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

A method and related systems are provided that can analyze and recommend solutions based on Extreme or Explosive Data (XD). XD, as used herein, may generally refer to data that is vast, increasing in size at an increasing rate, and/or changing over time, usage, location, etc. The method and system as disclosed herein can make distributed, data or decision science based recommendations and actions and can make increasingly smarter recommendations and actions over time.

A system and method is provided that can apply data or decision science to perform autonomous decisions and/or actions across various nodes and layers of the network, including various computing systems and devices. Data science or decision science may refer to math and science applied to data including but not limited to algorithms, machine learning, artificial intelligence science, neutral networks, and any other math and science applied to data. The results from data or decision science include, but are not limited to, business and technical trends, recommendations, actions, and other trends. Data or decision science includes but is not limited to individual and combinations of algorithms (may also be referred to herein as "algos"), machine learning (ML), and artificial intelligence (AI), to name a few. This data or decision science can be embedded, for example, as microcode executing inside of processors (e.g. CPUs, GPUs, TPUs, FPGAs, ASICs, neuromorphic chips), scripts and executables running in operating systems, applications, subsystems, and any combinations of the aforementioned. Additionally, this data or decision science can run as small "micro decision science" software residing in static and dynamic RAM memory, cache, EPROMs, solid state and spinning disk storage, and aforementioned systems that span a number of nodes with the aforementioned memory types and with different types of memory. A method for applying data and decision science to evaluate data can include, for example, Surface, Trend, Recommend, Infer, Predict and Action (STRIPA) data or decision science. Categories corresponding to the STRIPA methodology can be used to classify specific types of data or decision science to related classes, including for example Surface algorithms ("algos"), Trend algos, Recommend algos, Infer algos, Predict algos, and Action algos. Surface algos, as used herein, may generally refer to data science that autonomously highlights anomalies and/or early new trends; Trend algos, as used herein, may generally refer to data science that autonomously performs aggregation analysis or related analysis; Recommend algos, as used herein, may generally refer to data science that autonomously combines data, meta data, and results from other data science in order to make a specific autonomous recommendation and/or take autonomous actions for a system, user, and/or application; Infer algos, as used herein, may generally refer to data science that autonomously combines data, meta data, and results from other data science in order to characterize a person, place, object, event, time, etc.; Predict algos, as used herein, may generally refer to data science that autonomously combines data, meta data, and results from other data science in order to forecast and predict a person, place, object, event, time, and/or possible outcome, etc.; Action algos, as used herein, may generally refer to data science that autonomously combines data, meta data, and results from other data science in order to initiate and execute an autonomous decision and/or action.

Data or decision science examples may include, but are not limited to: Word2vec Representation Learning; Sentiment multi-modal, aspect, contextual; Negation cue, scope detection; Topic classification; TF-IDF Feature Vector; Entity Extraction; Document summary; Pagerank; Modularity; Induced subgraph; Bi-graph propagation; Label propagation for inference; Breadth First Search; Eigen-centrality, in/out-degree; Monte Carlo Markov Chain (MCMC) sim. on GPU; Deep Learning with R-CNN; Torch, Caffe, Torch on GPU; Logo detection; ImageNet, GoogleNet object detection; SIFT, SegNet Regions of interest; Sequence Learning for combined NLP & Image; K-means, Hierarchical Clustering; Decision Trees; Linear, Logistic regression; Affinity Association rules; Naive Bayes; Support Vector Machine (SVM); Trend time series; Burst anomaly detect; KNN classifier; Language Detection; Surface contextual Sentiment, Trend, Recommendation; Emerging Trends; Whats Unique Finder; Real-time event Trends; Trend Insights; Related Query Suggestions; Entity Relationship Graph of Users, products, brands, companies; Entity Inference: Geo, Age, Gender, Demog, etc.; Topic classification; Aspect based NLP (Word2Vec, NLP query, etc); Analytics and reporting; Video & audio recognition; Intent prediction; Optimal path to result; Attribution based optimization; Search and finding; and Network based optimization.

A Smart Distributed System can also be configured to transmit to and/or receive new data or decision science, software, data, and metadata from one or more other Smart Distributed Systems. Data or decision science can be updated and data or decision science driven queries, recommendations and autonomous actions can be broadcasted to other Smart Distributed Systems and third party systems in real-time or near real-time.

FIG. 1 shows an environment comprising Smart Distributed Systems 140 distributed across the network 160, according to an embodiment described herein. The computing environment 100 may comprise a plurality of Smart Distributed Systems 140 embedded across various devices and layers of the network 160. Each double-headed arrow illustrated in FIG. 1 can represent an edge or a link in the network 160 and the combination or collection of all such edges and/or links can be referred to as the network 160.

Smart Distributed Systems 140 can comprise various types of computing devices or components such as processors, memory devices, storage devices, sensors, or other devices having at least one of these as a component. Smart Distributed Systems 140 can have any combination of these as components. The Smart Distributed Systems 140 may comprise software modules, hardware components, or any combination thereof. Each of the aforementioned components within a computing device may or may not have data or decision science embedded in the hardware, such as microcode data or decision science running in a GPU, data or decision science running within the operating system and applications, and data or decision science running as software complimenting the hardware and software computing device.

As shown in FIG. 1, a computing environment 100 can comprise various layers in the network. In some embodiments, there may be three layers: first layer 110, second layer 120, and third layer 130. The number of layers across the network is only for illustration purposes and the number of layers may be increased or decreased based on the type of data, devices, functionalities, operations involved. For example, the number of layers can be 1, 2, 3, 4, 5, 6, 7, 8, 9, 10, 15, 20, 30, 50, 100, or any other integer number. In some embodiments, the lower the number associated with a layer, the closer the layer is to the point of data creation or the point at which the data of interest can be initially captured or obtained. For example, first layer nodes may be closer to the point of data creation than the second layer nodes, and the second layer nodes closer to the point of data creation than the third layer nodes. Assuming a three layer network, when a photo is taken with a mobile device and transmitted to a remote server over a network, the mobile device can correspond to the first layer device, the network devices supporting the transmission of the captured photo can correspond to the second layer, and the remote server can correspond to the third layer. The first 110, second 120, and third layer 130 may also be respectively referred to as "beginning", "middle", and "end". Each of the first 110, second 120, and third layers 130 may further comprise additional sub-layers, wherein each of the sub-layers may comprise various different categories of modules, devices, or systems.

The first layer (or the "beginning") 110 may comprise endpoint devices 111, 112, 113. While only three endpoint devices are illustrated in FIG. 1, the number of endpoint devices can be any integer number. The first layer 110 may be where data is first created, obtained, or captured. The endpoint devices 111, 112, 113 may include, but not limited to any peripheral computing devices or IoT devices, sensors, sensor systems, or general computing devices configured to collect, obtain, and/or process data. For example, peripheral computing devices may include cellular telephone, personal digital assistant (PDAs), a tablet, a desktop or a laptop computer, a wearable device, or any other devices including computing functionality and data communication capabilities. The endpoint devices may also comprise one or more IoT devices, configured to perform the methods and processes disclosed herein. The first layer 110 may include additional layers, wherein each layer may include different types of endpoint devices. For example, the first layer may comprise 2, 3, 4, 5, 6, 7, 8, 9, 10, 15, 20, 50, 100, or any integer number of sub-layers, wherein each sub-layer may comprise different types of endpoint devices.

The Smart Distributed Network Systems 140 may be installed, embedded, or attached to the endpoint devices 111, 112, 113. For example, endpoint device 1 (111) may have a Smart Distributed Network System 140 embedded in or attached to the device 111. The Smart Distributed Network Systems 140 installed, embedded, or attached to the endpoint devices 111, 112, 113 may be configured to intelligently determine—from the network 160 point of view—whether data resulting from the endpoint devices is duplicate and/or is "known known" data; based on the determination, the Smart Distributed Systems 140 may be configured to preempt sending and/or transmitting duplicative or "known known" data to other nodes of the network: preemptively stopping and not sending and/or not transmitting such duplicative or "known known" data can be important to managing network traffic involving XD.

The endpoint devices embedded or installed with Smart Distributed Systems 140 can be configured to perform various operations not possible with conventional endpoint devices. For example, endpoint devices enhanced with Smart Distributed Systems 140 can be configured to analyze and determine if: 1) the data is nominal; 2) the data is exceeding a certain operating condition; 3) the volume or accelerating metrics are changing. If the data is nominal or exactly the same, then the endpoint device can discard the information. If the data exceeds a certain operating range of business condition, for example, then the data can be marked as "urgent" or flagged and the endpoint device can further alert user(s), system(s), third party(s), etc. for immediate review and analysis. Data or metadata tolerance levels may be configured and applied to the raw data prior to the data being transmitted over the network; and if the data exceeds the configured tolerance levels, then the data can be transmitted, and if the data is within the tolerances, then the data can be discarded. Raw data may refer to data obtained, created, or captured by the endpoint devices, for example. If the volume or accelerating metrics of the data changes beyond a certain given range, then the endpoint devices with embedded Smart Distributed Systems 140 can be configured to automatically trigger various actions, such as automatically increasing the network or computing resources to manage the increased volume of data, for instance. For example, other nodes in the nearby region can be configured to allocate more network resources towards the endpoint device and its networking module facing increased network traffic. Data science embedded in the Smart Distributed Systems can include machine learning and its variants, which can also learn, model, and take actions; actions may include automatically discarding known known data, automatically triggering various actions, and increasing network or computing resources, to name a few.

The second layer 120 may comprise network devices 121, 122. Network devices 121, 122 may comprise one or more devices that may support, assist in the operation of the network. Network devices 121, 122 may include routers, switches, hubs, bridges, gateways, load balancers, and the like. While only two network devices (i.e., 121 and 122) are illustrated, there can be any N (wherein N is an integer) number of network devices in the second layer 120. The second layer 120 may also be referred to as the "middle" layer. The second layer, in turn, may comprise additional sub-layers, wherein each sub-layer can comprise various different categories of network devices, for example.

As illustrated in FIG. 1, the second layer 120 devices may have Smart Distributed Systems 140 installed, embedded, or attached to the network devices 121, 122. The Smart Distributed Systems 140 may be installed on or embedded to the network devices 121, 122 in a form of software, hardware, or any combination thereof. In some embodiments, the Smart Distributed Systems 140 that reside on the network devices 121, 122 may include, but are not limited to, databases, graph databases, artificial intelligent or machine learning executables that are installed on the network devices. The Smart Distributed System 140 may be part of the network device. For example, network devices may have Smart Distributed Systems 140 installed or embedded in the network device circuit board components (e.g., FPGAs, ASICs, CPUs, EEPROMs, etc.).

By embedding, installing, or attaching Smart Distributed Systems 140 into these second layer 120 nodes (e.g., network devices 121, 122), the second layer nodes 121, 122 can be configured to analyze and determine if: 1) the network data obtained at the second layer nodes is "normal"; 2) the network data obtained at the second layer nodes is exceeding certain "operating conditions"; and 3) "volume" or "accelerating metric" of the network data or traffic obtained at the second layer nodes is changing, for example. Different data or metadata tolerances can be applied to the data obtained at the second layer nodes prior to the data being sent or transmitted to other nodes in the network: if the data exceeds these tolerances, then the data is sent; if the data is within the tolerances, then the data is discarded. If the data obtained at the second layer nodes is "normal", then the network devices can discard the obtained data. If the data obtained at the second layer nodes exceeds a certain "operating condition", then the data can be marked as "urgent" by the network devices or the second layer nodes, and the other users, systems, devices, or third parties can be alerted or notified for immediate review and analysis. If the volume of data or any other metrics related to the data changes beyond a certain range, then the network devices or the second layer nodes can automatically trigger actions, such as automatically increasing more computing resources or bandwidth for certain network devices or nodes. For example, other nodes in the nearby region can be configured to allocate more network resources towards the network device facing increased network traffic. The second layer 120 nodes can be configured to obtain data from other second layer nodes or one or more first layer nodes.

The second layer 120 may also comprise one or more of what may be referred to as "aggregation" nodes, wherein the aggregation nodes can be configured to analyze network data collected from a plurality of endpoint devices in order to perform data science based on such aggregated data. Performing data science on network traffic/data at the second layer with distributed Smart Distributed Systems 140 can trap, analyze, and detect rare yet emerging trends that may not be caught or visible at an individual endpoint device level or any single nodes at the first layer 110.

The third layer 130 may comprise compute nodes 131, 132, 133. Compute nodes 131, 132, 133 may comprise servers, filers, databases, and the like. Compute nodes may also refer to a node of a computer cluster, wherein each compute node can be running its own instance of an operating system, for example. While only three compute nodes (i.e., 131, 132, and 133) are illustrated, there can be any N (wherein N is an integer) number of compute nodes in the third layer 130. The third layer 130 may also be referred to as the "end" layer. The third layer, in turn, may comprise additional sub-layers, wherein each sub-layer can comprise various different categories of computer nodes, for example.

The compute nodes 131, 132, 133 (i.e., third layer nodes) can be configured to run or execute data science by embedding, installing, or attaching Smart Distributed Systems 140 into the compute nodes 131, 132, 133. Third layer nodes (e.g., compute nodes) embedded or installed with Smart Distributed Systems 140 can be configured to analyze and determine if: 1) the network data obtained at the third layer nodes are "normal"; 2) the network data obtained at the third layer nodes is exceeding certain "operating conditions"; and 3) "volume" or "accelerating metric" of the network data or traffic obtained at the third layer nodes is changing, for example. If the data obtained at the third layer nodes is "normal", then the compute nodes can discard the obtained data. If the data obtained at the second layer nodes exceeds a certain "operating condition", then the data can be marked as "urgent" by the network devices or the second layer nodes, and the other users, systems, devices, or third parties can be alerted or notified for immediate review and analysis. If the volume of data or any other metrics related to the network data or traffic at the compute nodes changes beyond a certain range, then the compute nodes can automatically trigger actions, such as automatically increase more computing resources or bandwidth for certain compute nodes. For example, other nodes in the nearby region can be configured to allocate more network resources towards the compute node facing increased network traffic. The third layer 130 nodes can be configured to obtain data from other third layer nodes, one or more second layer nodes, and/or one or more first layer nodes. Overall, the network data or decision science applied at each compute node can surface, alert, and take corrective action at the earliest possible point or layer of the network, resulting in a faster and timely response compared to any current systems and methods.

The network 160 can comprise one or more combinations of both wired and wireless networks. The network 160 may be a communication pathway between any two nodes, devices, systems. The network 160 may comprise any combination of local area and/or wide area networks using both wireless and/or wired communication systems. For example, the network 160 may include the Internet, as well as mobile telephone networks. In one embodiment, the network 160 uses standard communications technologies and/or protocols. Hence, the network 160 may include links using technologies such as Ethernet, 802.11, worldwide interoperability for microwave access (WiMAX), 2G/3G/4G mobile communications protocols, asynchronous transfer mode (ATM), InfiniBand, PCI Express Advanced Switching, etc. Other networking protocols used on the network 160 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), and the like. The data exchanged over the network can be represented using technologies and/or formats including image data in binary form (e.g., Portable Networks Graphics (PNG)), the hypertext markup language (HTML), the extensible markup language (XML), etc. In addition, all or some of links can be encrypted using conventional encryption technologies such as secure sockets layers (SSL), transport layer security (TLS), Internet Protocol security (IPsec), etc. In another embodiment, the entities on the network can use custom and/or dedicated data communications technologies instead of, or in addition to, the ones described above.

Figure 2:
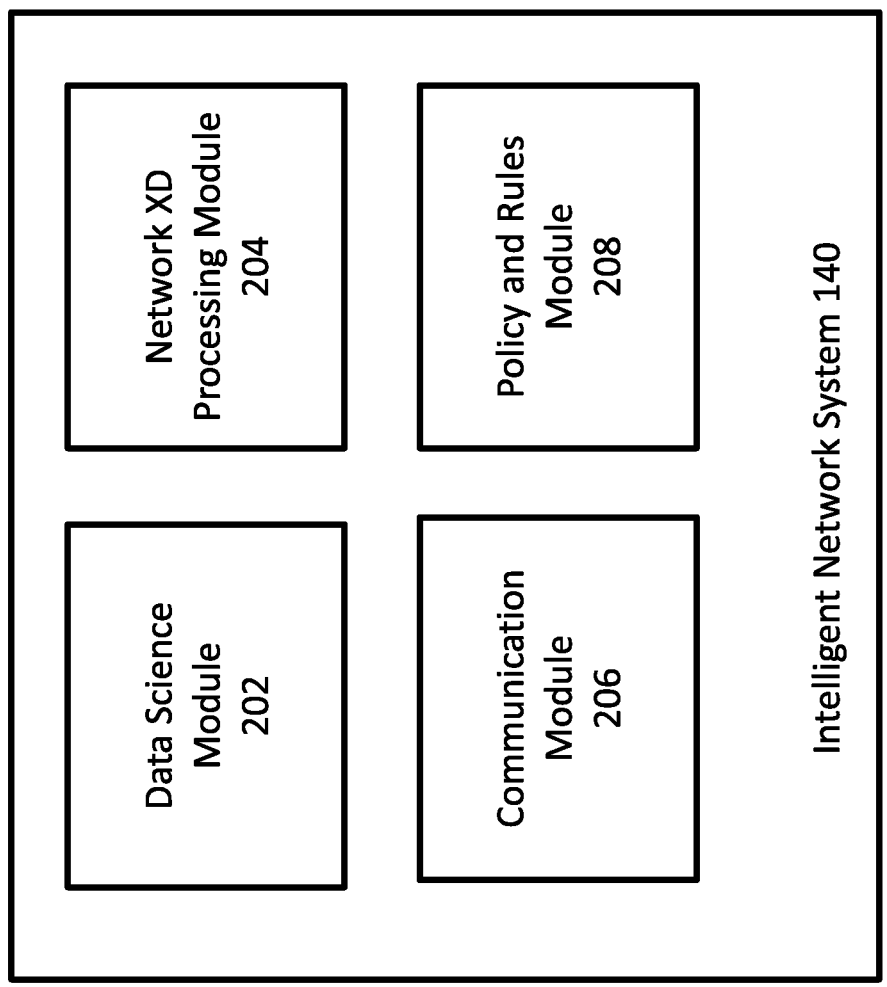
FIG. 2 shows components of a Smart Distributed System, according to some embodiments described herein.

FIG. 2 shows components of a Smart Distributed System 140, according to some embodiments described herein. The Smart Distributed System 140 may comprise data science module 202, network XD processing module 204, a communication module 206, a policy and rules module 208.

These components of the Smart Distributed System 140 may be functional components that can generate useful data or other output using specific input(s), or may include or be connected to storage or databases. The components can be implemented as general or specific-purpose hardware, software, firmware (or any combination thereof) components. A component may or may not be self-contained. Depending upon implementation-specific or other considerations, the components may be centralized or distributed functionally or physically. Although a particular number of components are shown in FIG. 2, the Smart Distributed System 140 can include more components or can combine the components into fewer components (such as a single component), as may be desirable for a particular implementation. One or more of the components can be implemented across multiple distinct Smart Distributed Systems 140. The interactions among these components are illustrated in detail below.

The data science module 202 may be configured to provide data or decision science algorithms and/or toolboxes and related functionalities to the Smart Distributed System 140. The data science module 202 may interact with the network XD processing module 204 to aid in the processing of network data or traffic as it relates to XD. For example, the data science module 202 may store one or more data science algorithms accessible by one or more other modules of the Smart Distributed System 140, including the network XD processing module 204. The data science module 202 may also interact with the communication module 206 and may be configured to be updated via the network 160 or any other communication methods. The data science module 202 may also interact with the policy and rules module 208 in order to update or configure the policy and rules stored in the module, for example. The data science module 202 may be associated with one or more storages or databases, the data science algorithms and/or toolboxes stored in such storages or databases may be updated via the network 160.

The communication module 206 may be configured to provide various types of communication functionalities to the Smart Distributed System 140. The communication module 206 may be configured to provide communication with the network 160. The communication module 206 may be configured to provide Smart Distributed Systems peer-to-peer or direct communication capabilities with other Smart Distributed Systems 140. For example, each Smart Distributed System 140 can be configured to automatically and autonomously query other Smart Distributed Systems 140 in order to better analyze information and/or apply recommendations and actions based upon, or in concert with, one or more other Smart Distributed Systems 140 and/or third party systems. For example, third-party systems may be any systems which may benefit from interacting or being in communication with the Smart Distributed Systems. Third-party system examples include, but not limited to systems and databases associated with ComScore, FICO, National Vulnerability Database, Center for Disease Control and Prevention, U.S. Food and Drug Administration, and World Health Organization, and the like.

The network XD processing module 204 may be configured to process XD, network data, network traffic, and other data related to the network or XD. For example, each Smart Distributed System 140 can optionally have an ability to reduce "noise" and in particular, to reduce XD that is "known known" data or data that may be duplicative. "Known known" data can be in the form of both known data as well as, but not limited to preexisting known answers, recommendations, trends, or other data that is already known or adds no new information.

Alternatively or additionally, "known known" network data may be determined by establishing a "reference data set" (i.e., a master dataset), which may contain one or more answers, recommendations, trends, or other data. The "reference data set" may include historical trends, including certain time, dates, regions, when network data or network traffic congestion occurred, for example. "Known known" data may be any data that, when compared to the "reference data set", is determined to be a duplicate or an unnecessary data set for the computation at hand. Such "reference data set" may be stored as part of the network XD processing module 204 or may be separate from the network XD processing module 204. The premise is that if the data is identical or is within a certain tolerance level or meets certain business rule conditions or other pre-defined nominal state, then there may not be a need to transmit, store, compute such duplicative data, and/or include such duplicative data as part of the computation.

In some embodiments, a Smart Distributed System 140 can apply, for example, System on Chip (SOC) or DSP-like filters to analyze and discard duplicative or duplicative-like data (e.g., "known known" data) throughout a computing environment 100, thereby eliminating the need to transmit or process such data in the first place. The network XD processing module 204 may be configured to execute the aforementioned process. This method can, for example, reduce network traffic, improve computing utilization, and ultimately facilitate the application of efficient real-time/ near real-time data or decision science with autonomous decisions and actions. This reduction of network XD or XD in general, especially at the local level or through a distributed computing environment 100 may provide a system comprising or embedding Smart Distributed Systems 140 the ability to identify eminent trends and to make preemptive business and technical recommendations and actions faster, especially since less duplicative data or XD allows for faster identification and recommendations. The tolerance level mentioned above may be configured by one or more Smart Distributed Systems 140 based on the type of computation involved, in order to optimize the computational efficiency.

Alternatively or additionally, the SOC, for example, can make localized decisions on the Smart Distributed Network System 140 using the sensors, onboard computing resources which contain localized data science, onboard SOC storage used as a local reference data set, as described above. Such configuration can enable fact local decision making and action.

The network XD processing module 204 may also be configured to provide each Smart Distributed System 140 with data or decision science software including but not limited to operating systems, applications, and databases, which directly support the data or decision science driven Smart Distributed System 140 actions. For example, Linux, Android, MySQL, Hive, and Titan or other software could reside on each Smart Distributed Systems 140 so that the local data or decision science can query local, on device, related data to make faster recommendations and actions. In another example, applications such as Oracle and SAP can be queried by the network XD processing module 204 in order to reference financial information, manufacturing information, and logistics information, wherein such information may aid the system in providing improved data science decision(s) and execute the best action(s).

The policy and rules module 208 may be configured to provide data or information on policies and rules governing the Smart Distributed Systems 140. The policy and rules module 208 may be configured to provide information or data on, for example, governing policies, guidelines, business rules, nominal operating states, anomaly states, responses, KPI metrics, and other policies and rules applicable to any network data or traffic. The distributed network of Smart Distributed Systems 140 may be configured to rely on such policies and rules to make local and informed autonomous actions based on the collected set of network data. A number (e.g., $N_{IPRS}$) of policy and rules modules can exist, and each module 208 can have either identical or differing policies or rules amongst themselves or alternatively can have varying degrees or subsets of policies and rules. For example, each layer of the network 160 may comprise different sets of policy and rules and each policy and rules module 208 may be configured accordingly. Multiple sets of policy and rules may exist for each policy and rules module 208. This latter alternative is important when there are localized business and technical conditions that may not be appropriate for other domains or geographic regions, and/or different manufacturing facilities, laboratories, to name a few.

Each Smart Distributed System 140 can also be configured to predict and determine which network or networks 160, wired or wireless, are optimal for communicating information based upon local and global parameters including but not limited to network traffic conditions, proposed network 160 volume and content, and priority/severity levels, to name a few.

In some embodiments, a Smart Distributed System 140 can optionally select a multitude of different network methods to send and receive information, either in serial or in parallel. A Smart Distributed System 140 can optionally determine that latency in certain networks are too long or that a certain network has been compromised, for example, by providing or implementing security protocols, and can be configured to reroute content using different encryption methods and/or reroute to different networks. A Smart Distributed System 140 can optionally define a path via for example nodes and networks for its content.

Smart Distributed System Configuration

As shown in FIG. 1, a computing environment 100 can comprise Smart Distributed Systems 140 installed, embedded, or attached to the various nodes of the network, wherein the Smart Distributed Systems 140 can enable each node to perform or apply localized data or decision science. In particular, Smart Distributed Systems 140 can be provisioned for example, with localized data or decision science (e.g. algos, ML, AI, and other data or decision science) using localized processors including but not limited to CPUs, GPUs, TPUs, FPGAs, ASICs, neuromorphic chips and other localized processors as known in the art or yet to be developed.

In some embodiments, data science can be inserted at the various nodes of the network, including the first, second, third layer nodes by "flashing" or installing the network data science into the various endpoint devices, network devices, and compute nodes.

To perform localized data or decision science related to the local data, Smart Distributed Systems can execute the localized decision science: 1) by microcode running inside of a CPU(s), GPU(s), TPU(s) FPGA(s), ASIC(s), neuromorphic chip(s); 2) by executing code in RAM, EEPROM, solid state disks, rotational disks, cloud based storage systems, storage arrays; 3) by executing code spanning a number of Smart Distributed Systems and a number of the aforementioned processor, memory, and store combinations.

Data Processing

Figure 3A:
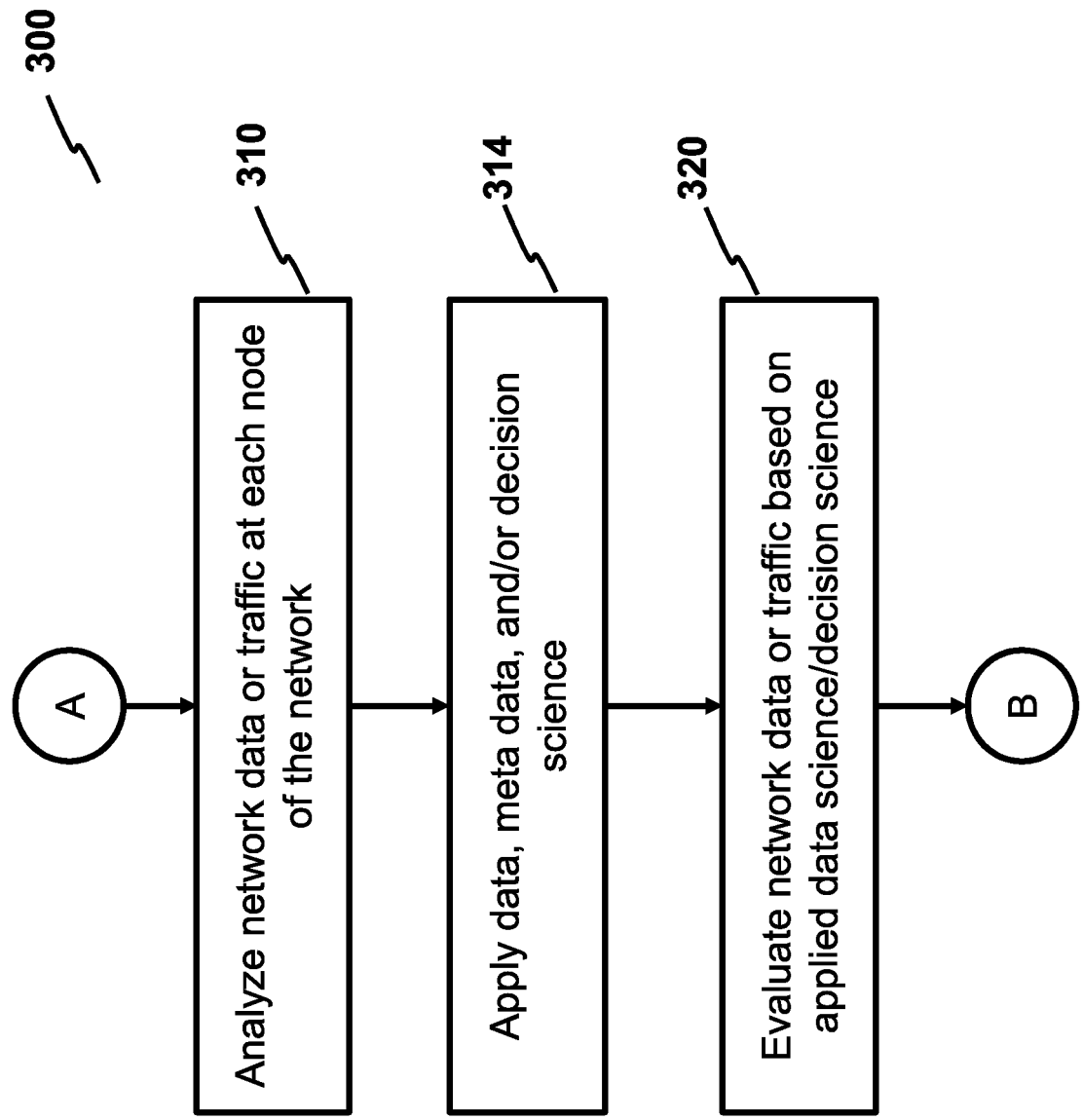
FIG. 3A shows a flowchart for a method for managing XD according to an embodiment described herein.

FIG. 3A shows a flowchart for a data processing method 300 for efficiently managing and directing network traffic or data, according to an embodiment described herein. In some embodiments, the network XD processing module 204 may be configured to execute the data processing method described below. First, an Smart Distributed System can begin at 310 by creating or obtaining new data (e.g. machine data, system logs, user generated related data, meta data, multimedia data and meta data, sensor and IoT related data, or any other form of new data). As the data is locally generated, the data can immediately be fed at 312 directly (as opposed to transmitting directly to other devices/nodes in the network) into the Smart Distributed System's (or those of the device which embeds or installs such Smart Distributed Systems 140) local processors, RAM, memory or other local components or any other combination thereof, in real-time, batch mode, or any combination of both real-time and batch mode for local processing. As the data is fed into the local components (processors, memory, and/or disk), the localized data or decision science, running on this Smart Distributed System 140, can be applied at 314 to this local data. Localized network XD data processing can be distinguished from transmitting XD to a remote server to be processed and later receiving the post-processed data.

As data is transmitted across the network 160 from the first layer 110 to upper layers (e.g., second layer 120 and third layer 130), the Smart Distributed System 140 can be configured to make autonomous and localized network decisions among the various network devices. For example, the Smart Distributed Systems 140 can be configured to autonomously communicate among the network devices embedded with Smart Distributed Systems 140 to make automated network decisions among the network devices without having to go to a person, network operating center, etc. in order to, for example, 1) decide the best/optimal network paths; 2) automate summoning more network bandwidth or devices networks are congested or various network issues arise.

Example 1: Local Decision Science Applied to Locally Generated Data

Figure 3B:
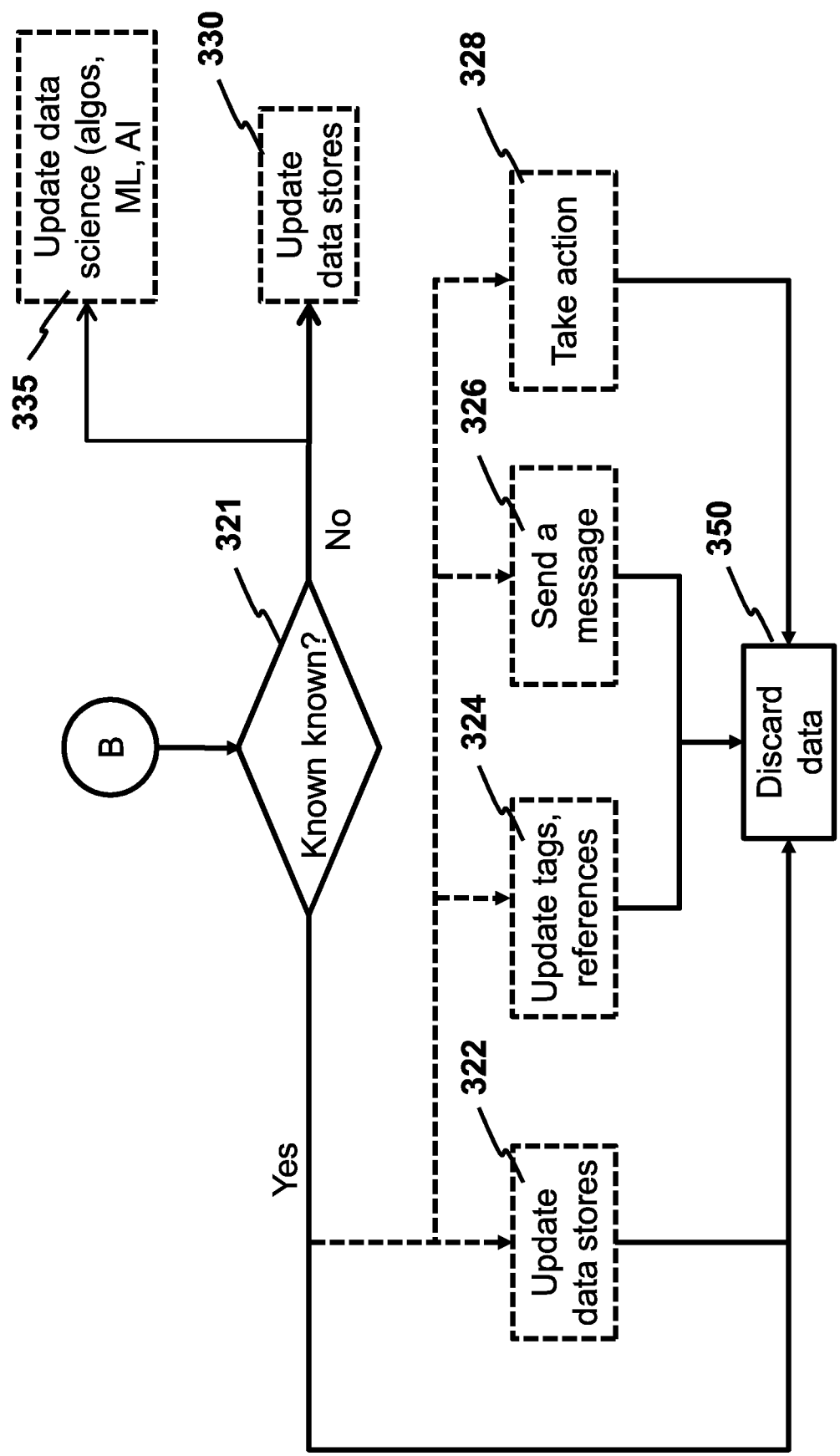
FIG. 3B shows a flowchart for a method for evaluating XD according to an embodiment described herein.

Applying data or decision science to the locally created data may involve one or more various operations to evaluate the data (operation 320). FIG. 3B shows a flowchart for a method for evaluating locally generated data, according to an embodiment described herein. In one embodiment, as shown in FIG. 3B, the inbound data can be evaluated to determine whether it is a known known or whether it is an anomaly or a new unknown.

The inbound data can be determined to be known known at 321, for example, if the inbound data is based on existing data, answers, data science, or rules residing in the local memory, index, database, graph database, apps or other local memory or storage components). If the inbound data is determined to be "known known", then the components and/or Smart Distributed Systems 140 may be configured to discard the XD at 350 rather than send or transmit this data through networks and other Smart Distributed Systems. This operation can eliminate unnecessary network bandwidth usage and computing/storing usage, and ultimately reduce network traffic.

In some embodiments, at 322 the local Smart Distributed Systems 140 can update the local and/or global data stores, graph databases, data science systems or third party systems with this known known data for statistical purposes, for example, before it discards the XD at 350. Such update may provide useful in determining whether any data generated later should be considered, for example, a known known. Alternatively at 324, the local Smart Distributed System 140 can update tags or references for this "known known" data to existing "known known" data stored locally and/or to other global Smart Distributed Systems 140, for example, before it discards the XD at 350.

In some embodiments, at 328 the local Smart Distributed System 140 can take an action, including but not limited business rules, computing requirements, workflow actions, or other actions related to this "known known" data, via the XD processing module 208, as described above. For example, the "known known" data may provide a basis for executing one or more algorithms, before the Smart Distributed System discards the XD at 350. Additionally, based on a data type result, the local Smart Distributed System can perform dynamic data determinant switching whereby the data type can drive a certain action, such as a business action or technical response in real-time. For example, if the number of similarly characterized anomalies reaches a certain number during a given time window, then an alert or a message can be sent and/or transmitted to a person or an administrator for deeper analysis or the system may be configured to automatically analyze and diagnose such anomalies.

In addition or in the alternative, the local Smart Distributed System 140 can combine any of the aforementioned embodiments, for example, any of steps 322, 324, 326, and/or 328 before it discards the XD at 350.

If the data is evaluated and determined to be an anomaly or a new unknown at 321, the Smart Distributed System 140 can update at 330 the local data stores, graph databases, index, memory, apps, or other data stores to include the anomaly or new unknown.

Figure 3C:
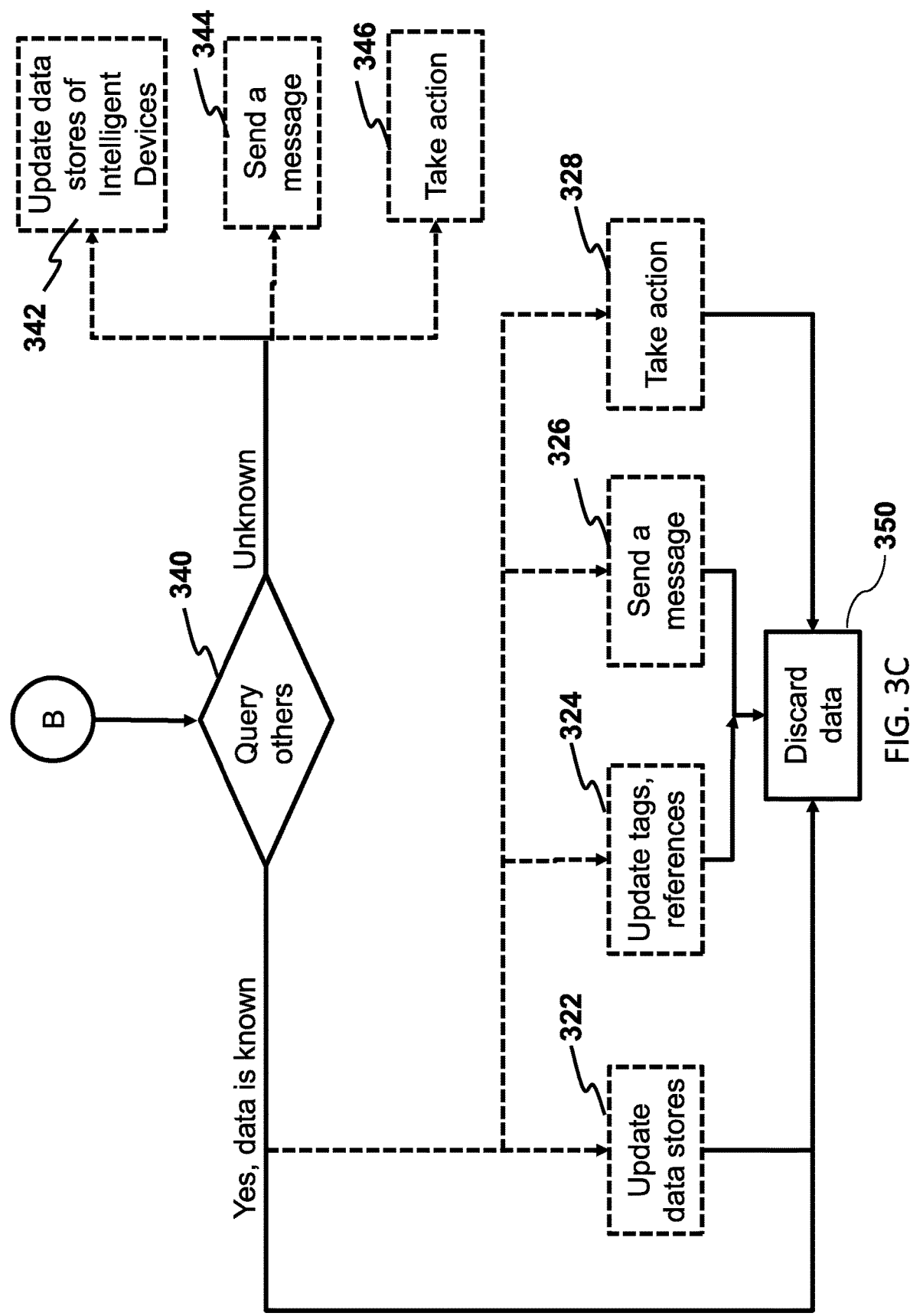
FIG. 3C shows a flowchart for a method for querying other Smart Distributed Systems according to an embodiment described herein.

In some embodiments, as shown in FIG. 3C, the data evaluation step at 320 can comprise the local Smart Distributed System 140 autonomously communicating and querying at 340 other Smart Distributed Systems 140 to determine if this data is a truly an anomaly or a "known known". The local Smart Distributed System 140 can query at 340, for example, other Smart Distributed System(s) to determine if data is an anomaly or a known known. If the query results from other Smart Distributed Systems 140 respond with no answers, then all local and global Smart Distributed System 140 data stores, graph databases, memory, apps, and third party systems can be autonomously updated with the new data at 342 and can take a corresponding autonomous action(s) at 346. If the query results from other Smart Distributed Systems 140 respond with answers indicating the data is known, then the local Smart Distributed System 140 can update its local data store, graph database, index, memory, apps, and/or third party systems and can take a corresponding action at 328.

In addition or in the alternative, the local Smart Distributed System 140 can combine any of the aforementioned embodiments, for example, any of steps 321, 322, 324, 326, 328, before it discards the known known XD at 350 and any of the aforementioned embodiments, for example, any of the steps 340, 342, 344 and/or 346 if it determines the XD is an anomaly or is unknown.

Example 2: Localized Decision Science Applied to Locally Generated Data

Referring to FIG. 3C, if the data is an anomaly, then at 346 the original Smart Distributed System 140 can prioritize more resources (e.g., network bandwidth or computation resources) to analyze or evaluate this anomaly based on business rules, data or decision science, computing availability or other operations related considerations. In some embodiments, if the response is that the new anomaly triggers an alert, for example, message(s) can be transmitted at 344 to a number ($N_P$) of people, applications, and systems similar to the Pacific Ocean Tsunami alert system.

Figure 4:
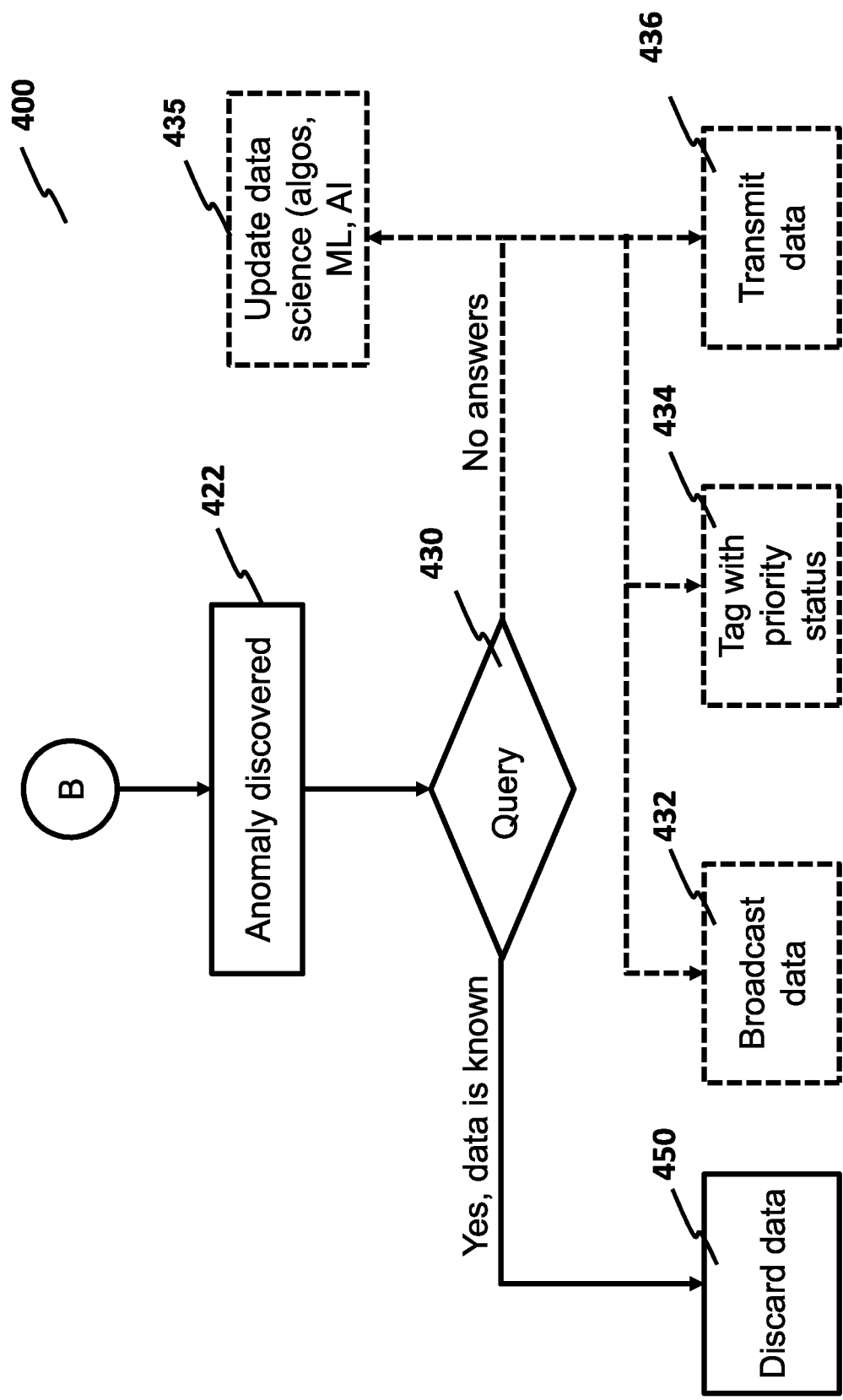
FIG. 4 shows a flowchart for another method for managing XD according to an embodiment described herein.

FIG. 4 shows a flowchart for another data processing method 400 for managing network XD using Smart Distributed Systems 140, according to an embodiment described herein. As shown in FIG. 4, the inbound data can be evaluated to determine whether it is a known known or whether it is an anomaly or a new unknown. In some embodiments, anomaly may be discovered after following the operations described in FIG. 3A-3C. If an anomaly is discovered at 422, the Smart Distributed System 140 can apply data or decision science (e.g. the STRIPA methodology) to send queries at 430 to other Smart Distributed Systems 140 that may know if the anomaly is wide spread (e.g., a known anomaly). If other Smart Distributed Systems 140 respond and answer that the anomaly preexists and is a "known known", then the node at which Smart Distributed System 140 discovered the anomaly can proceed to discard the data at 450. If the data is determined to be unknown, for example, or if there are no answers or the response is that the anomaly does not pre-exist, then the data can be broadcasted at 432 to other Smart Distributed Systems with the new information and/or data or decision science related to the new data.

In some embodiments, the newly discovered data or anomaly can be tagged, marked, or linked at 434 with a priority status for expedited processing. The newly discovered data or decision science patterns can be transmitted at 436 to other Smart Distributed Systems 140 to facilitate fast discovery and recommended actions. For example, if five (5) new anomalies have occurred in five (5) different locations around the world, the "Infer" decision science (e.g. as part of the STRIPA method) may be applied to determine that the five (5) different anomalies have similar characteristics. Based upon this common denominator anomaly profile, for instance, the Surface decision science (e.g., as part of the STRIPA method) in order to alert systems and/or people of the new potential trend.

In addition or in the alternative, a Smart Distributed system 140 can combine any of the aforementioned embodiments, for example, any of steps 340, 342, 344, 346, and 348 shown in FIGS. 3A-3B in combination with any of steps 422, 424, 426 and 428 shown in FIG. 4.

Data or Decision Science and Software Updates

In some embodiments, Smart Distributed Systems 140 can be configured to transmit and/or receive data or decision science and/or software updates from other interconnected systems or the network 160. These updates can enable fast and automated, batch or manual software revisions to Smart Distributed System indexers, database, graph, algo, data science software as new information is learned or software updates are released. Hence devices or systems embedded or enhanced with Smart Distributed Systems 140 components not only eliminate XD noise data along the compute processing chain but these same devices get automatically smarter as time elapses by receiving these new software updates and executing these updates in real-time.

Making the response time of these Smart Distributed Systems 140 smarter over time, is important in order to continually remove and/or tune these devices to better perform embodiments. For example, time series based machine learning can perform removing and/or tuning these devices for optimal performance.

In some embodiments, the Smart Distributed Systems 140 have the ability to transmit and/or receive and/or execute data or decision science and/or software updates from third party systems. Additionally or in the alternative, a third party system can have the ability to transmit and/or receive data or decision science in order to update Smart Distributed Systems. Any combination of the aforementioned can be performed within a method, according to an embodiment described herein.

Smart Distributed System Walkthrough and Processing Examples

In some embodiments, an Smart Distributed System 140 can be inserted at a point where data is first created (e.g., in a node of a first layer 110 of the network 160). A number of different Smart Distributed Systems 140 can be inserted at points where data is first created, each generating machine data and metadata, user generated data and metadata, system data and metadata. Additionally, each endpoint devices embedded with Smart Distributed systems 140 can comprise data or decision science STRIPA intelligence, wherein intelligence includes but is not limited data or decision science that: can apply STRIPA filters and can ignore "known known" answers and data; can apply STRIPA to sense and detect certain types of data, patterns, images, audio, multimedia, etc. and to update the Smart Distributed systems 140 and/or notify users, and/or update third party systems; can apply STRIPA to reference, tag and/or index known known an or new anomaly or new unknowns; can apply STRIPA to the data and can take action(s) including but not limited applying automated or batch oriented business rules, applying automated or batch oriented apps, or performing system or workflow actions using data science and/or business rules; can apply STRIPA to the data and can take action(s) including but not limited to applying automated or batch oriented business rules, applying automated or batch oriented apps, performing system or workflow actions using algos and/or business rules based on a prioritizing algorithm or rules; can apply STRIPA to the data and can send alerts and messages to other Smart Distributed Systems 140.

Updating an Smart Distributed System

Figure 5:
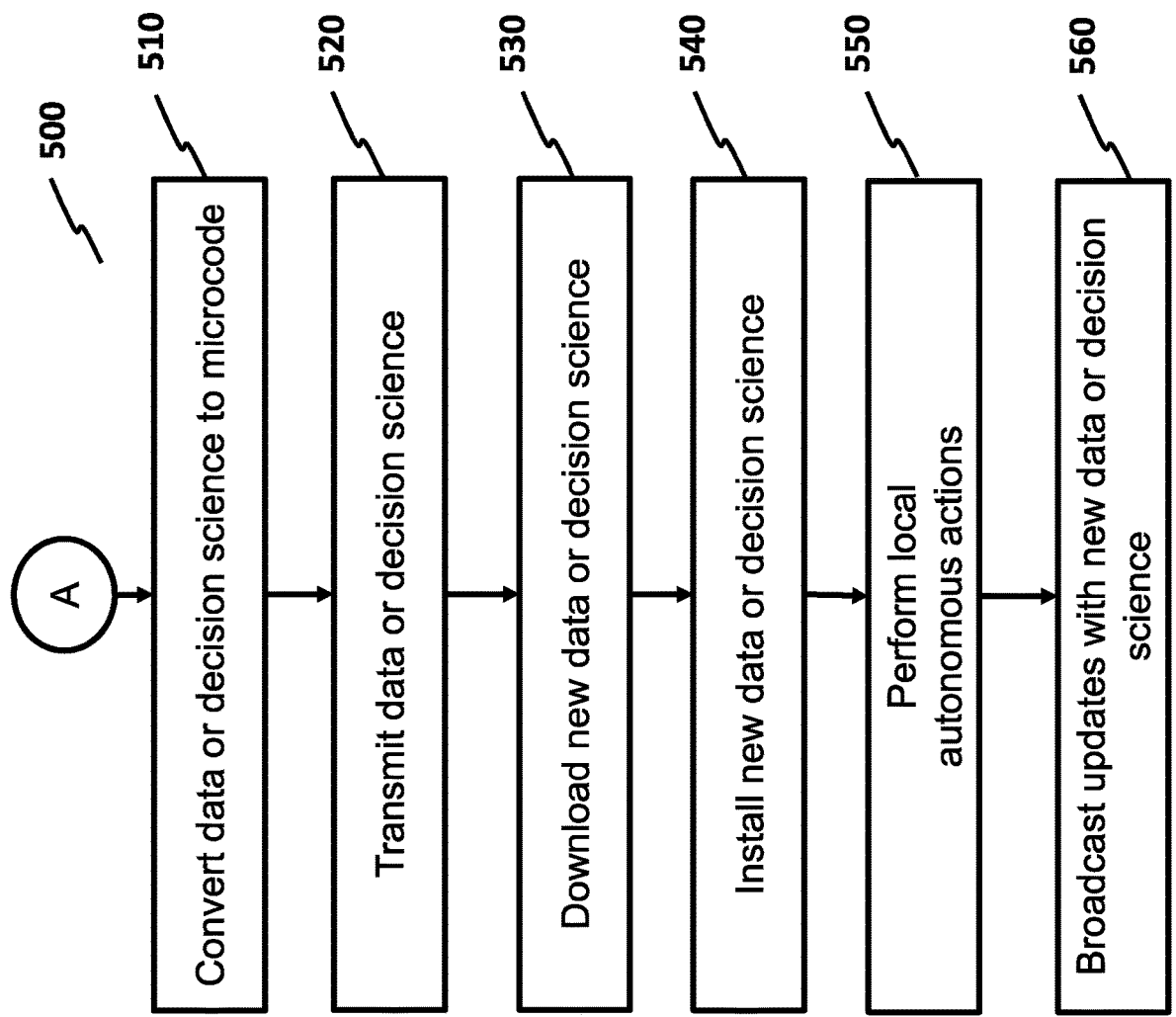
FIG. 5 shows a flowchart of a method for updating a Smart Distributed System, according to an embodiment described herein.

FIG. 5 shows a flowchart of a method 500 for updating an Smart Distributed System 140. In some embodiments, Smart Distributed System (e.g., creating or processing IoT data)

data or decision science can be developed and converted to FPGA based microcode at 510. The data or decision science can be transmitted at 520 over network(s) (e.g., network 160). Updated data or decision science and can be downloaded, automatically, for example, at 530. The Smart Distributed System 140 can be configured to automatically install the downloaded data or decision science, or can "flash" the new data or decision science at 540 into an FPGA. Alternatively, the operation at 540 may involve updating the existing data or decision science on the FPGA. The Smart Distributed System 140 is then operationalized using the latest data or decision science. Such installation or update may be performed autonomously or may be configured to be performed at certain intervals or may be triggered by certain events.

The process descriptions or blocks in the flowcharts presented in FIGS. 1, 2, 3A-3C, and 4-5 may be understood to represent modules, segments, or portions of code or logic, which include one or more executable instructions for implementing specific logical functions or steps in the associated process. Alternative implementations are included within the scope of the present invention in which functions may be executed out of order from the order shown or described herein, including substantially concurrently or in reverse order, depending on the functionality involved, as would be understood by those reasonable skilled in the art after having become familiar with the teachings of the present invention.

Example: IoT Device Embedded with Smart Distributed Systems

Let's assume an IoT device (i.e., first layer device) generates data about itself such as temperature condition, self-diagnostic metrics such as wear, and so forth and the IoT device continuously generates this data in a nonstop, real-time fashion. In the given example, an "unintelligent" IoT device may send all of this data through networks 160 and downstream computing systems (e.g., second layer and third layer nodes), which in turn determines if something is unusual about the temperature and or the self-diagnostics are not in compliance. The result of relying on "unintelligent" endpoint devices: transmit XD data through the network 160, ingest XD data into a data store, perform expensive de-duplication and find result.

The "intelligent endpoint devices (i.e., an endpoint device embedded with Smart Distributed systems 140), by contrast, has onboard network data science. As data streams off the IoT device, the networked micro analytic algos can inspect data, real time, and "sniff" for data that is nominal. If the data is nominal, then the onboard logic could be programmed to purge the nominal data. Alternatively, the network data science could trigger an action, such as adding more network bandwidth, based on specific data patterns. In an alternative embodiment, the network data science could tag this data with different priority levels or markers. Higher priority or severity markers could alarm downstream systems and users about unusual data so that network related actions can take place sooner and faster.

In an alternative embodiment, there are situations where IoT devices may be geographically disparate. When thousands or millions of IoT devices generate real time data, there could be situations where certain geographic regions, locations, etc. could result in detecting early anomalies or emerging trends sooner than other geographic disparate IoT devices. In these situations, data science driven network devices could automatically recognize an unusual network pattern and then automatically message other geographic disparate IoT devices, geographic disparate network devices, etc. that there is an anomaly and to take appropriate and autonomous network actions, such as adding bandwidth or changing configuration to prevent a security attack.

Example: Components with Smart Distributed System Embedded

Components such as disk drives, microprocessors, sensors, etc. may have embedded network data science. This is likely given the industry trend for system on a chip (SOC) technology and increasingly more features and functionality onto a single piece of silicon. The same example and rational listed in the prior IoT example applies here as well with the exception that the data science is "embedded into a device" as opposed to running as software on top of the IoT device. Putting this network data science embedded into the SOC drives cost down, an important factor for component manufacturers.

In another embodiment, the Smart Distributed IoT device may have a transceiver and network data science in a SOC platform.

The network applications and micro applications that reside on Network Intelligent SOCs include, but are not limited to, micro databases, micro graph databases, micro AI/ML executables to name a few. These distributed micro data science, programs, applications, etc. enable the distributed SOC to perform localized data comparisons without having to traverse the network 160 to see if the data is a known known or an anomaly, for example. Eliminating the SOC from having to perform I/O and traverse back through systems of external information and search and validate whether a piece of data is a known known vastly reduces overall end to end latency. Furthermore, localized network Intelligent data science driven applications and databases residing on the SOC accelerate ML and AI recommendations; this furthers autonomous data science driven network management.

Example: Network Devices (or Second Layer Nodes) with Embedded Smart Distributed Systems Intermediary network devices (routers, switches, load balancers, etc.) that create data and move network data may have various levels of Smart Distributed data science embedded in the network circuit board components (FPGAs, ASICS, CPUs, GPUs, TPUs, EEPROMs, etc). In one embodiment, a Smart Distributed device may, in some cases, have minimal amount of components to run basic network algos due to cost concerns. In other cases, these same devices may have increasingly more powerful network components facilitating more powerful network data science and perform autonomous network decision making actions.

In another embodiment, network applications and micro applications that reside on switches, routers running network Intelligent SOCs include, but are not limited to, micro databases, micro graph databases, micro AI/ML executables to name a few. These distributed micro data science, programs, applications, etc. enable the distributed SOC to perform localized data comparisons without having to traverse the network to see if the data is a known known or an anomaly, for example. Eliminating the SOC from having to perform I/O and traverse back through systems of external information and search and validate whether a piece of data is a known known vastly reduces overall end to end latency. Furthermore, localized network intelligent data science driven applications and databases residing on the SOC accelerate ML and AI recommendations; this furthers autonomous data science driven network management.

In another embodiment, the Smart Distributed System 140 may have a Smart Distributed messaging bus. The network intelligent bus predicts and prioritizes messaging and actions to occur among N number of Smart Distributed IoT devices, traditional networks and network devices, and edge nodes with Smart Distributed computing. For example, a Smart Distributed message bus residing on a network switch can determine that 80% of the capacity is sustained and autonomously summon additional switch bandwidth in order to reduce the original switch capacity back to a normal 70% throughput capacity.

Figure 6:
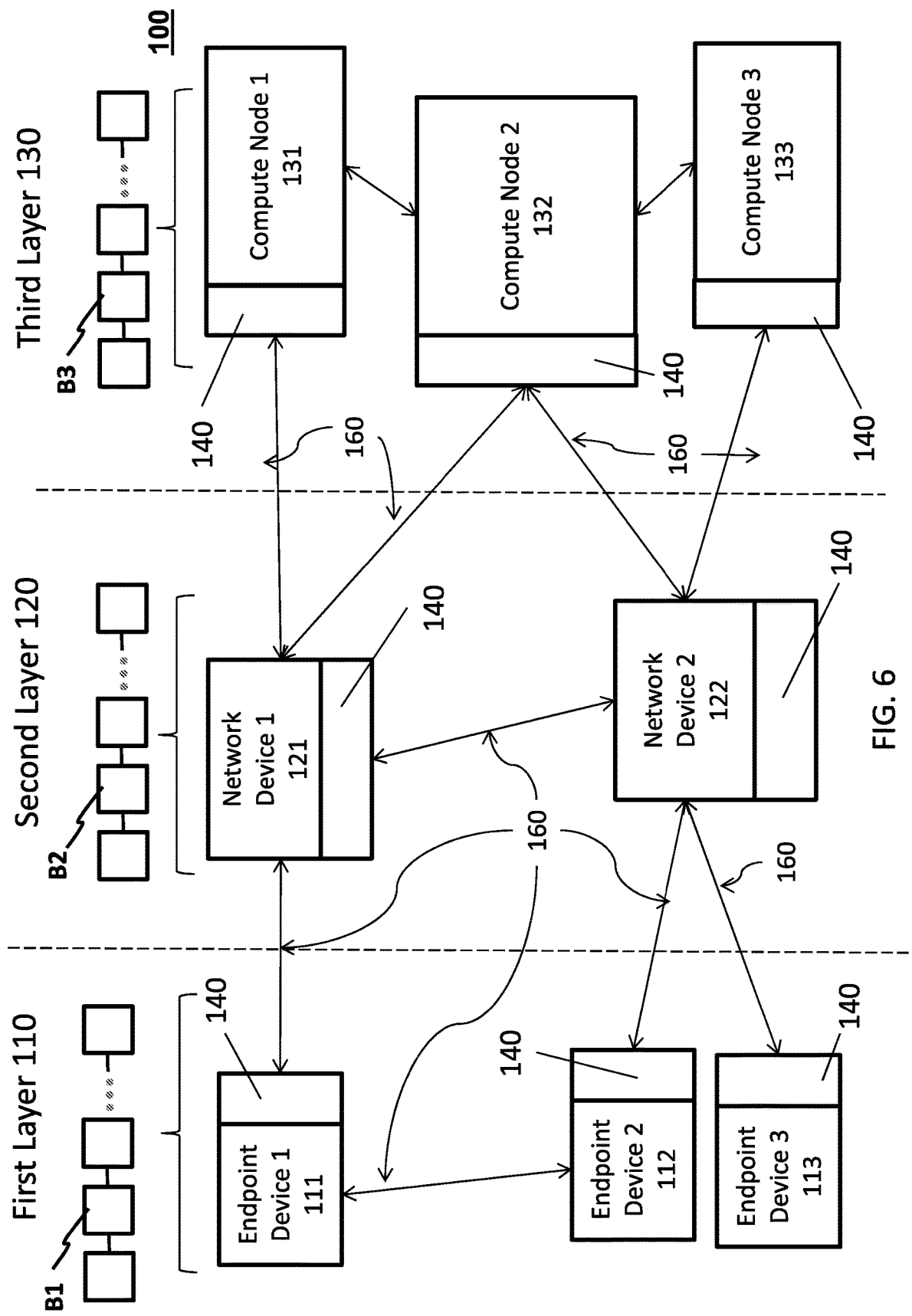
FIG. 6 shows a first blockchain distributed across the first layer, a second blockchain distributed across the second layer and a third blockchain distributed across the third layer according to an embodiment described herein.

In another example embodiment shown in FIG. 6, different blockchains are distributed across different layers of the computing environment 100. In particular, a first blockchain B1 is stored in a distributed manner across the devices in the first layer 110, a second blockchain B2 is stored in a distributed manner across the devices in the second layer 120, and a third blockchain B3 is stored in a distributed manner across the devices in the third layer 130.

In an example aspect, the blockchain B2 integrates the data between the blockchains B1 and B3. For example, if a device on the first blockchain B1 wishes to execute a transaction with a device on the third blockchain B3, then the transaction takes place over the second blockchain B2, which determines and records equivalent data mappings. In other words, the data specific to the device on the first blockchain B1 is equated to data specific to the device on the third blockchain B3; the data specific to the device on the third blockchain B3 is equated to data specific to the device on the first blockchain B1; and these data mappings are computed and recorded by the devices on the second blockchain B2. The devices in the second blockchain B2 provides transaction details suitable for the first blockchain B1, and these details are recorded in a distributed manner on the first blockchain B1. Similarly, the devices in the second blockchain B2 provides transaction details suitable for the third blockchain B3, and these details are recorded in a distributed manner on the third blockchain B3. A transaction herein refers to an interaction between one or more devices in the first blockchain B1 and one or more devices in the third blockchain B3.

In another example aspect, at least one of the first blockchain B1, the second blockchain B2 and the third blockchain B3 is a private blockchain and at least another one of these blockchains B1, B2 and B3 is a public blockchain.

In another example aspect, all the blockchains B1, B2 and B3 are different public blockchains. In another example aspect, all the blockchains B1, B2 and B3 are different private blockchains.

It will be appreciated that blockchains refer to a type of distributed ledger technology, and some blockchains do not have "blocks" of data while others do have such blocks.

Figure 7:
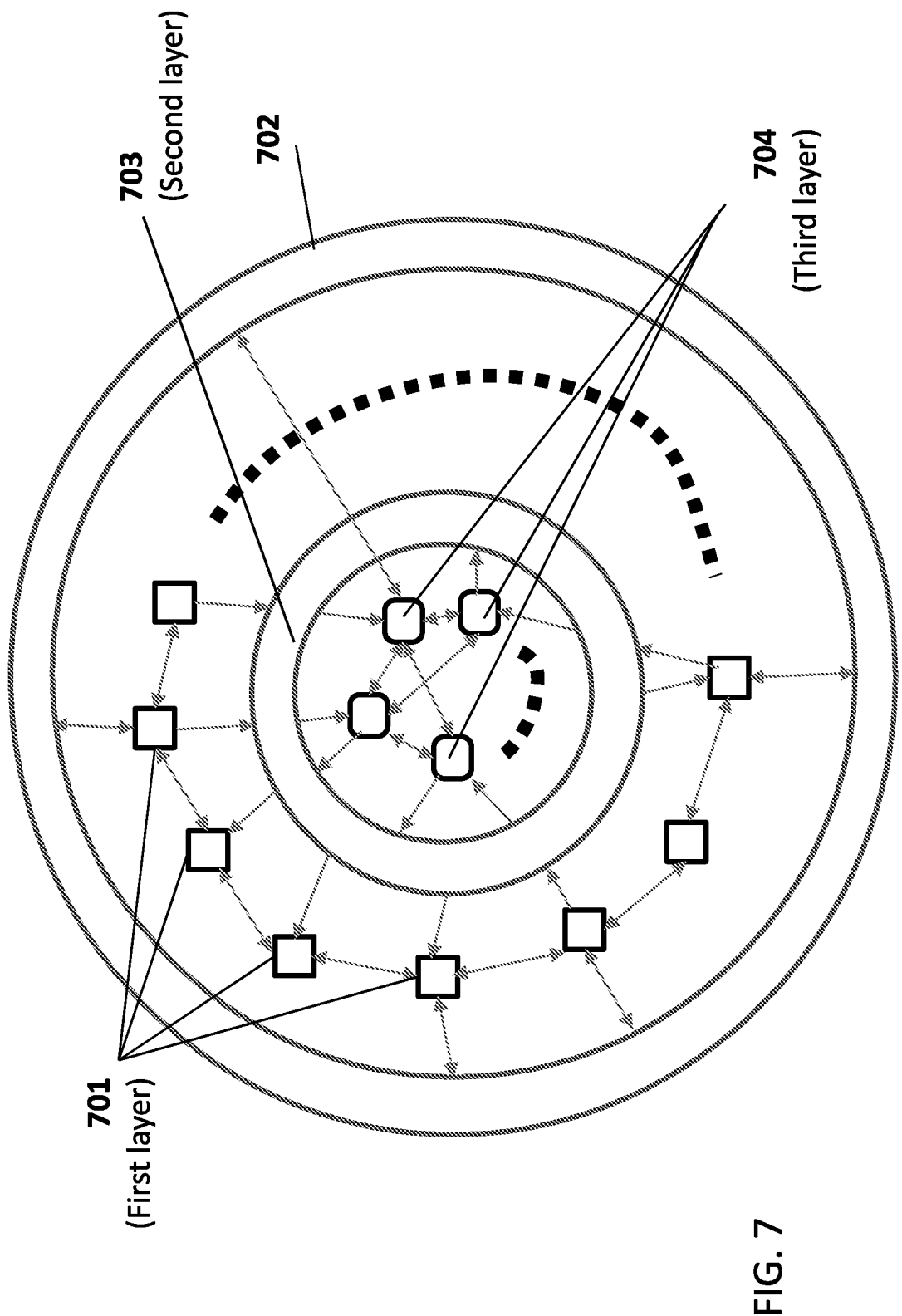
FIG. 7 shows an edge database distributed across the first layer, a load balancer system distributed across the second layer, and a master database distributed across the third layer, according to an embodiment described herein.

In another example embodiment as shown in FIG. 7, an example architecture of the first layer 701 of devices (corresponding to the first layer 110), the second layer 703 of devices (corresponding to the second layer 120), and a third layer of devices 704 (corresponding to the third layer 130) interact with each other. For example, the devices in the first layer 701 interact with each other and one or more environments to collect data, sense data, capture data, communicate data, process data, store data, etc. In another example, these devices in the first layer 701 interact with 3rd parties 702 (e.g. 3rd party databases, 3rd party devices, 3rd party environments, 3rd party platforms, etc.). The devices in each of the layers 701, 703 and 704 include Smart Distributed systems 140.

In another example aspect, the devices in the first layer 701 form a faceted database. A faceted database herein refers to multiple databases. In an example aspect, at least some of these databases are related to each other. For example, different subsets of the devices in the first layer 701 are used in different environments or different applications, or both. In another example, different subsets of the devices in the first layer 701 also have different functions or different capabilities, or both. These differences lead, for example, to developing different databases, which as a collective is herein called a faceted database. In an example aspect, there is commonality amongst the databases in the faceted database, including, but not limited to, one or more of the following commonalities: common index(es), common pattern(s), common thematic data, common type(s) of data, common topic(s) of data, common event(s) in the data, common action(s) in the data, etc.

The devices in the first layer 701 transmit data to a load balancer system comprising the devices in the second layer 703 (e.g. which comprises one or more load balancing devices). The load balancer system of the second layer 703 then transmits the data to one or multiple devices in the first layer 704. These devices in the third layer 704 are also herein called Intelligent Synthesizer Endpoint Systems.

In an example embodiment, the devices in the third layer 704 form a master database. In another example embodiment, either in addition or in alternative, the devices in the third layer 704 execute computations to process the received data using additional data science. The devices in the third layer 704 synthesize the data received from the devices in the first layer 701 by applying STRIPA. In other words, the devices in the third layer 704 act as a centralized computing resource on behalf of the devices in the first layer 701, even though the third layer 704 is actually a collective of separate and distributed devices.

The master database residing on the third layer 704 can be referenced or queried by one or more devices in the first later 701. Conversely, one or more of the devices in the third layer 704 can query one or more of the databases that form part of the faceted database, which is stored in the first layer 701.

The load balancer on the second layer 703 manages the distribution of data, processing, and communication amongst the devices in the third layer 704. The load balancer also manages the distribution of data, processing and communication amongst the devices in the first layer 701.

Figure 8:
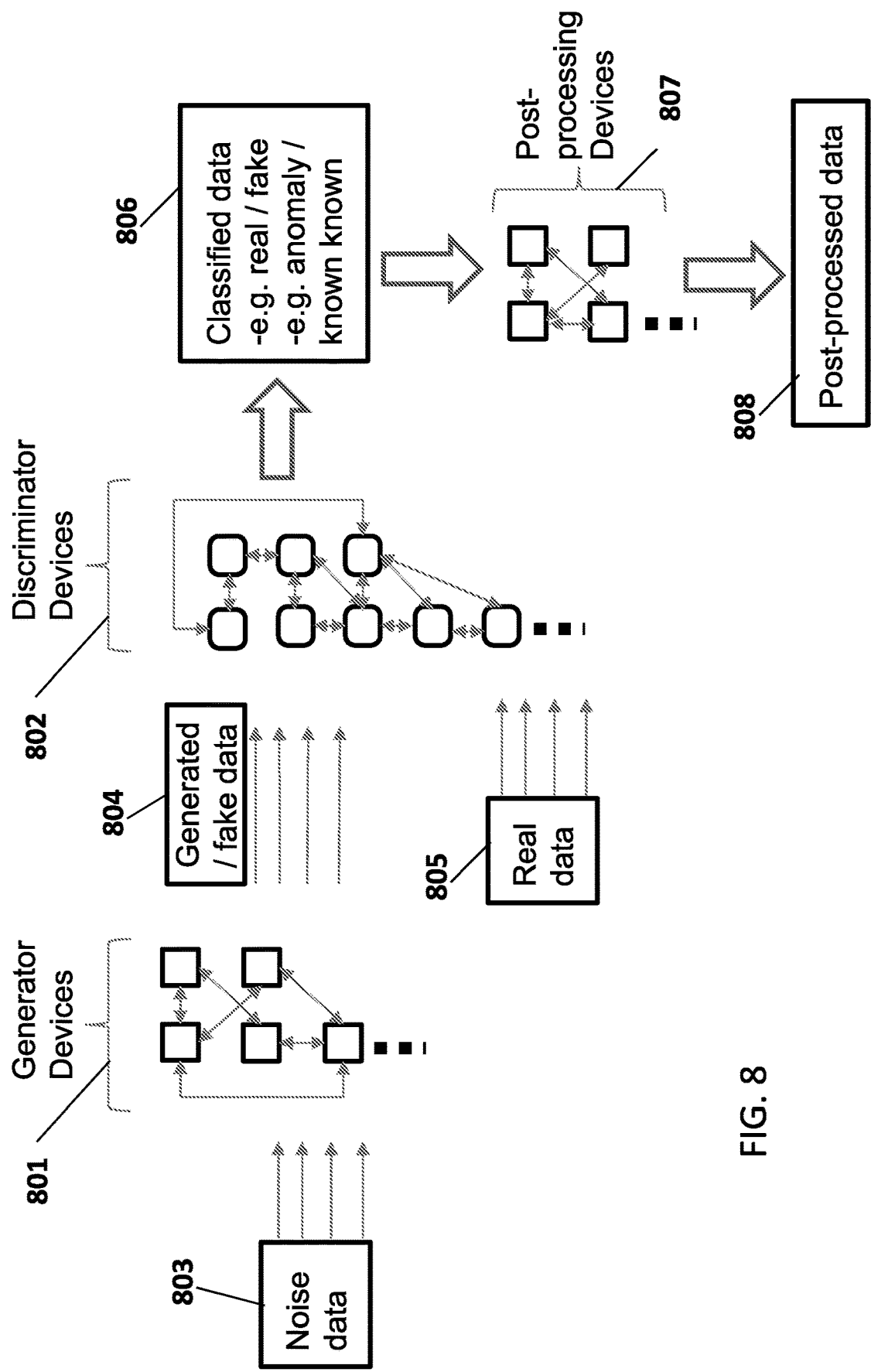
FIG. 8 shows a generator neural network distributed across the first layer, a discriminator neural network distributed across the second layer, and a post-processor distributed across the third layer according an embodiment described herein.

Turning to FIG. 8, another example embodiment of an architecture of devices each including Smart Distributed Systems 140 is provided. Different sets of devices form different portions of a neural network system. The example shown in FIG. 8 relates to generative adversarial networks (GANs), which is used in artificial intelligence. The devices in the first layer 801 (which corresponds to the first layer 110) includes generator endpoint devices that implement a generator neural network. The devices in the second layer 802 (which corresponds to the second layer 120) includes discriminator network devices that implement a discriminator neural network. The devices in the third layer 807 (which corresponds to the third layer 130) includes post-processing compute devices. The devices in the third layer 801 store and run a generator neural network in a distributed manner. The devices in the second layer 802 store and run a discriminator neural network in a distributed manner.

In particular, the generator devices in the first layer 801 obtain, sense or capture noise data 803 and use this noise data to compute generated data or fake data 804. The discriminator devices in the second layer 802 obtain, sense or capture real data 805. The discriminator devices in the second layer 802 use the real data 805 and the generated data 804 to make classifications or predictions 806 in relation to the obtained real data 805. For example, the classifications or predictions include determining whether something is real or fake. In another example, the classifications or predictions include determine whether an anomaly has been detected or predicted, or whether a known known has been detected or predicted. For example, the real data is classified is an anomaly or a known known. In another example, using the second layer predicts whether future data or a future event is an anomaly or a known known.

This classified data or predicted data 806 is passed forward to the post-processing devices in the third layer 807, which then output post-processed data 808. For example, the post-processed data is a command or some other data derived from the classified or predicted data 806.

In other neural network computing systems, not limited to GANs, different portions of the neural networks are implemented by different sets of devices in different layers.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the servers or devices or accessible or connectable thereto. Any application or module herein described may be implemented using computer readable/executable instructions that may be stored or otherwise held by such computer readable media.

It will be appreciated that different features of the example embodiments of the system and methods, as described herein, may be combined with each other in different ways. In other words, different devices, modules, operations, functionality and components may be used together according to other example embodiments, although not specifically stated.

The process descriptions or blocks in the flowcharts presented herein may be understood to represent modules, segments, or portions of code or logic, which include one or more executable instructions for implementing specific logical functions or steps in the associated process. Alternative implementations are included within the scope of the present invention in which functions may be executed out of order from the order shown or described herein, including substantially concurrently or in reverse order, depending on the functionality involved, as would be understood by those reasonable skilled in the art after having become familiar with the teachings of the present invention. It will also be appreciated that steps may be added, deleted or modified according to the principles described herein.

It will also be appreciated that the examples and corresponding system diagrams used herein are for illustrative purposes only. Different configurations and terminology can be used without departing from the principles expressed herein. For instance, components and modules can be added, deleted, modified, or arranged with differing connections without departing from these principles.

Although the above has been described with reference to certain specific embodiments, various modifications thereof will be apparent to those skilled in the art without departing from the scope of the claims appended hereto.

What is claimed is:

1. A system for providing distributed and autonomous network actions, comprising:
   a network comprising three layers, each layer comprising a plurality of nodes, wherein each of said plurality of nodes is connected to at least one other node among said plurality of nodes;
   a first layer node comprising an end point device embedded with data science capabilities, wherein said end point device is configured to receive first layer data,
      wherein said first layer data comprises data received from one or more end point devices,
      and wherein said end point device is further configured to apply data science to autonomously adjust the operations of said one or more end point devices based on said first layer data;
   a second layer node connected to one or more first layer nodes, said second layer node comprising a network device embedded with said data science capabilities,
      wherein said network device is configured to receive second layer data,
      wherein said second layer data comprises data received from said one or more end point devices and/or said one or more network devices,
      and wherein said network device is further configured to apply data science to autonomously adjust the operations of said one or more end point devices and/or said one or more network devices based on said second layer data; and
   a third layer node connected to said one or more first layer node and/or said one or more second layer node, said third layer node comprising a compute node embedded with said data science capabilities,
      wherein said third layer compute node is configured to receive third layer data and to apply data science based on said third layer data,
      wherein said third layer data comprises data received from said one or more end point devices, said one or more network devices, and/or one or more compute nodes,
      and wherein said compute node is further configured to apply data science to autonomously adjust the operations of said one or more first, second, or third layer nodes, based on said third layer data.

2. The system of claim 1, wherein applying said data science to said end point device comprises determining if: (i) said first layer data is nominal or constant; or (ii) said first layer data matches a pre-defined/specific pattern; or (iii) said first layer data exceeds a configurable operating threshold value or condition or (iv) a variation or change in said first layer data exceeds a threshold.

3. The system of claim 2, wherein said end point device is configured to discard said first layer data if said first layer data is nominal or constant.

4. The system of claim 2, wherein said end point device is configured to tag said first layer data if said first layer data matches a pre-defined/specific pattern.

5. The system of claim 2, wherein said end point device is configured to flag said first layer data as urgent if said first layer data exceeds a certain operating threshold value or condition.

6. The system of claim 5, wherein said end point device is further configured to alert said one or more first layer elements, said one or more second layer elements, or said one or more third layer elements.

7. The system of claim 2, wherein said end point device is configured to autonomously increase network or computing resources if said variation or change in said first layer data exceeds a threshold.

8. The system of claim 1, wherein applying said data science to said network device comprises determining if: (i) said second layer data is nominal; or (ii) said second layer data matches a specific pattern; (iii) said second layer data is exceeding a certain operating condition; or (iv) a variation or change in said second layer data exceeds a threshold.

9. The system of claim 8, wherein said network device is configured to discard said second layer data if said second layer data is nominal or constant.

10. The system of claim 8, wherein said network device is configured to tag said second layer data if said second layer data matches said specific pattern.

11. The system of claim 8, wherein said network device is configured to flag said second layer data as urgent if said second layer data exceeds a certain operating threshold value or condition.

12. The system of claim 11, wherein said network device is further configured to alert said one or more first layer elements, said one or more second layer elements, or said one or more third layer elements.

13. The system of claim 8, wherein said network device is configured to autonomously increase network or computing resources if said variation or change in said second layer data exceeds a threshold.

14. The system of claim 1, wherein applying said data science to said compute node comprises determining if: (i) said third layer data is nominal; (ii) said third layer data matches a specific pattern; (iii) said third layer data is exceeding a certain operating condition; or (iv) a variation or change in said third layer data exceeds a threshold.

15. The system of claim 14, wherein said compute node is configured to discard said third layer data if said third layer data is nominal or constant.

16. The system of claim 14, wherein said compute node is configured to tag said third layer data if said third layer data matches a pre-defined/specific pattern.

17. The system of claim 14, wherein said compute node is configured to flag said third layer data as urgent if said third layer data exceeds a certain operating threshold value or condition.

18. The system of claim 17, wherein said compute node is further configured to alert said one or more first layer elements, said one or more second layer elements, or said one or more third layer elements.

19. The system of claim 14, wherein said compute node is configured to autonomously increase network or computing resources if a variation or change in said third layer data exceeds a threshold.

20. The system of claim 1, wherein said end point device is configured to obtain or generate data.

21. The system of claim 1, wherein said network device comprises a router, a switch, or a load balancer.

22. The system of claim 21, wherein said data science capabilities are embedded in the network circuit board components of said network device, said network circuit board components comprising FPGAs, ASICS, CPUs, and EEPROMs.

23. The system of claim 22, wherein said network device is configured to run distributed micro data science programs and applications.

24. The system of claim 1, wherein said first layer comprises a plurality of sub-layers.

25. The system of claim 1, wherein said second layer comprises a plurality of sub-layers.

26. The system of claim 1, wherein said third layer comprises a plurality of sub-layers.

27. The system of claim 1, wherein a first blockchain is distributed across multiple first layer nodes in said first layer, a second blockchain is distributed across multiple second layer nodes in said second layer, and a third blockchain is distributed across multiple third layer nodes in said third layer.

28. The system of claim 27 wherein a given first layer node on said first blockchain and a given third layer node on said third blockchain execute a transaction using said multiple second layer nodes in said second blockchain.

29. The system of claim 27 wherein, in executing a transactions between a given first layer node on said first blockchain and a given third layer node on said third blockchain, said multiple second layer nodes in said second blockchain equate data specific to said given first layer device on said first blockchain to data specific to said given third layer device on said third layer blockchain; or said multiple second layer nodes in said second blockchain equate data specific to said given third layer device on said third blockchain to data specific to said given first layer device on said first layer blockchain; or both.

30. The system of claim 1 wherein a database is distributed across multiple first layer nodes in said first layer, a load balancer system comprises multiple second layer nodes in said second layer, and a master database is distributed across multiple third layer nodes in said third layer.

31. The system of claim 30 wherein said multiple first layer nodes comprise multiple end point devices, said multiple second layer nodes comprise multiple network devices, and said multiple third layer nodes comprise multiple compute nodes.

32. The system of claim 30 wherein a given first layer node queries said master database on said third layer, via said load balancer system.

33. The system of claim 1 wherein one of said first layer, said second layer and said third layer is used to implement a first portion of a neural network, and a remaining one of said first layer, said second layer and said third layer is used to implement a second portion of said neural network.

34. The system of claim 1 wherein a generator neural network is implemented in said first layer to output generated data, a discriminator neural network is implemented in said second layer to output classified or predicted data, and said classified or predicted data is post-processed in said third layer; and wherein said generator neural network and said discriminator neural network form a generative adversarial network.

35. The system of claim 34 wherein said second layer obtains real data, and said discriminator neural network on said second layer outputs a classification whether said real data is an anomaly or a known known.

36. The system of claim 34 wherein said second layer obtains real data, said discriminator neural network on said second layer outputs a prediction whether future data or a future event is an anomaly or a known known.

* * * * *